Nov. 4, 1952 — P. M. BLOUGH — 2,616,240
ALTERNATING CURRENT CLOCK
Original Filed Dec. 2, 1931 — 2 SHEETS—SHEET 2

Inventor:
Paul M Blough
By Geo. S. Oines
Atty.

Patented Nov. 4, 1952

2,616,240

UNITED STATES PATENT OFFICE 2,616,240

ALTERNATING CURRENT CLOCK

Paul M. Blough, Chicago, Ill., assignor to
Joseph A. Kroll, Chicago, Ill.

Substituted for abandoned application Serial No.
578,438, December 2, 1931. This application
December 12, 1951, Serial No. 261,306

3 Claims. (Cl. 58—26)

My invention relates generally to electric clocks and more particularly to clocks adapted to be driven directly by the electric current supplied to consumers for electric light and power service. This application is substituted for applicant's prior abandoned application Serial No. 578,438, filed December 2, 1931, of identical title.

It is now the practice for electric power companies to supply alternating current of accurately regulated frequency for general distribution. While the frequency of the current may vary slightly from minute to minute, the frequency is governed so that the total number of alternations per given period, is exactly uniform. A synchronous motor driven clock supplied with current from a source at which the frequency is thus carefully regulated, may be made to indicate the correct time excepting only such slight discrepancies as may result from slight variations in the frequency of the current. With present equipment and control mechanism, this variation is not cumulative, so that the inaccuracies in time indication by synchronously driven clocks is so small as to be of negligible importance in clocks used for ordinary purposes.

Synchronous motor driven clocks of a type adapted to be used in systems as above described have been known. Synchronous motors of this type consist essentially of a magnetic rotating member which carries salient magnetic poles and which is caused to revolve by the intermittent electro magnetic field of a stationary member positioned near the rotating element. My invention consists of the improvement in clocks of this type to make them more reliable, more simple in construction and less liable to be affected by variations in the current supply.

It is one of the objects of my invention to provide an improved non-self-starting synchronous motor driven time indicating device, which may be easily started either manually or by auxiliary mechanical means, and which, if started at a speed other than the normal synchronous speed, will, as it drops to synchronous speed, automatically get in step and thereafter maintain its exact synchronous speed.

A further object of this invention is to provide an improved synchronous motor having a slow motor speed, whereby the life of the motor will be prolonged and the motor vibration substantially eliminated.

A still further object of this invention is to provide an improved means for mounting the motor parts and gear train upon the clock frame, resulting in a minimum number of parts compatible with compactness and ease of assembly.

A still further object of this invention is to provide an improved manner for mounting the shafts of the clock assembly, whereby all of said shafts will have only a single bearing, with the result that perfect bearing alignment may be had with ease of assembly.

A still further object of this invention is to provide an improved auxiliary mechanical means for launching the motor, whereby the same may be started in the proper direction and at substantially the same speed at all times.

A still further object of this invention is to provide an improved inertia means applicable to the rotor of a synchronous motor, which will be effective in aiding the maintaining of the rotor at synchronous speed.

With the foregoing and other objects in view, which will appear as the description proceeds, the invention consists in certain novel and improved features of construction, arrangement and combination of parts hereinafter more fully described, illustrated in the accompanying drawings, and particularly pointed out in the appended claims, it being understood that various changes in the form, size, shape and minor details of construction may be made without departing from the spirit or sacrificing any of the advantages of the invention.

For the purpose of facilitating an understanding of my invention, I have illustrated in the accompanying drawing a preferred embodiment thereof, from an inspection of which, when considered in connection with the following description, my invention, its mode of operation, construction and assembly, and many of its advantages should be readily understood and appreciated.

Referring to the drawings in which similar characters of reference are employed to indicate corresponding or similar parts throughout the several figures of the drawings.

Figure 1:
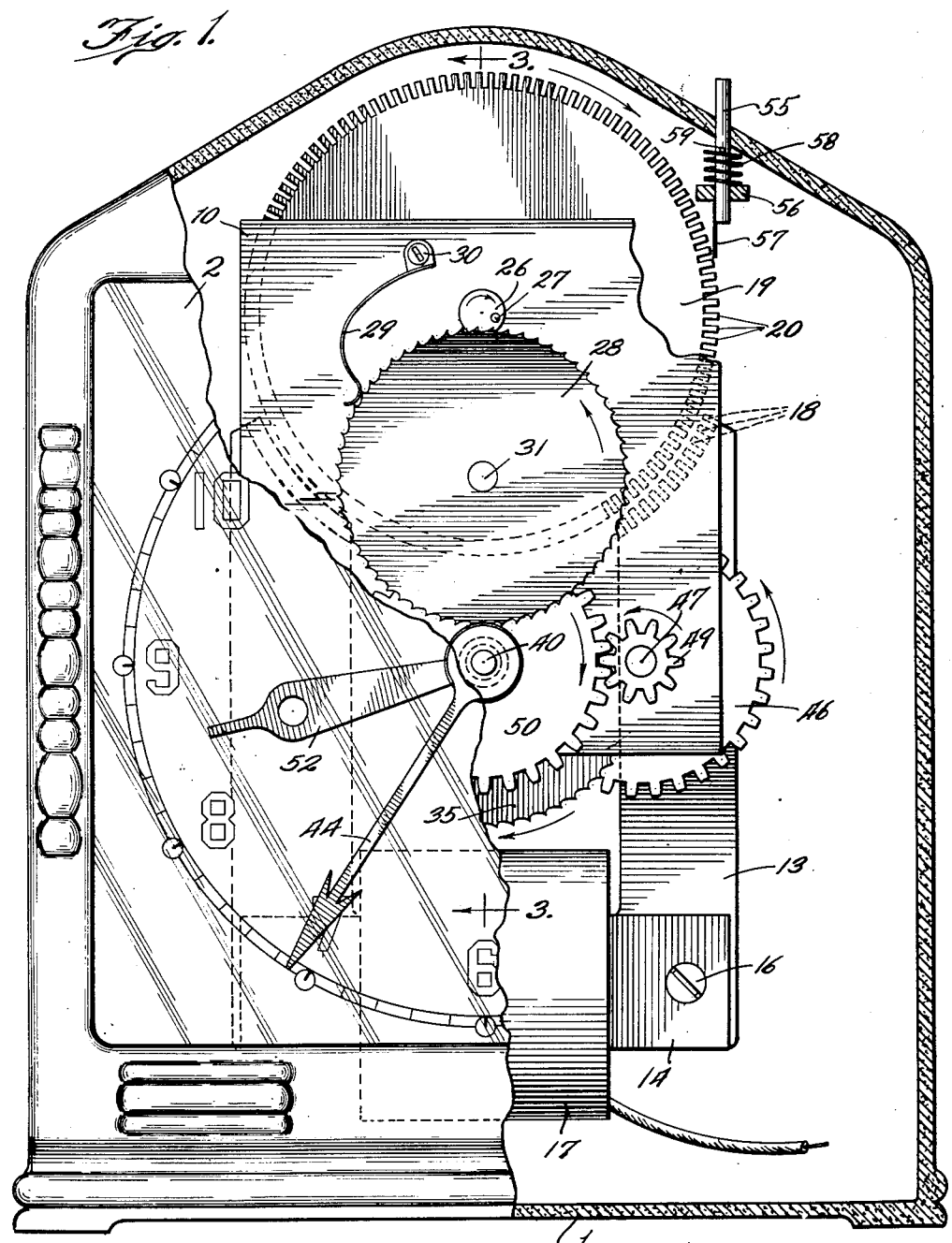
Figure 1 is a front elevation of my improved clock, portions of the casing and dial being broken away to show the underlying parts.

Referring to the drawings more specifically by characters of reference, the numeral 1 designates generally a clock casing, which may be of any suitable material and shape for compactly housing my improved clock mechanism. The front of the casing 1 is provided with the usual crystal 2 of material suitable for that purpose, through which may be readily viewed the dial 3. The clock of this invention comprises the front plate 10 and the rear plate 11, said plates being held in spaced relation by the brass bushing 12, to which the said plates are permanently secured. The clock is driven by a synchronous motor which comprises a substantially U shaped field frame 13, to the lower portion of which is secured a cross member 14. The upper portion of the frame 13 is secured by means of the screws 15 to the rear plate member 11. The cross member 14 is secured to the frame 13 in any suitable and well known manner, such for example as by means of the screws 16. The coil 17 is wound upon the cross piece 14, said coil being in circuit with the alternating current delivered from the commercial power source by which the clock is actuated. The uppermost portions of the upstanding arms of the frame 13 are provided with a plurality of teeth 18, as shown in Figure 1, said teeth being arranged on an arc of a circle so as to match teeth with a rotor 19, disposed between the arms of the field frame, as shown in Figure 1 of the drawings and in position to be actuated thereby.

The rotor 19 comprises a magnetic disc having teeth 20, formed on its periphery, and is rigidly secured to a rotor shaft 21, which is journaled in the bushing 12, for rotation therein. The rotor shaft is thus mounted in a single bearing whereby the same may be easily arranged in operative position with the assurance that the same will be in proper alignment at all times. The rotor 19 is of a relatively large size so as to produce a relatively slow speed motor, resulting in a longer life for the motor and in the elimination of motor vibrations.

Figure 2:
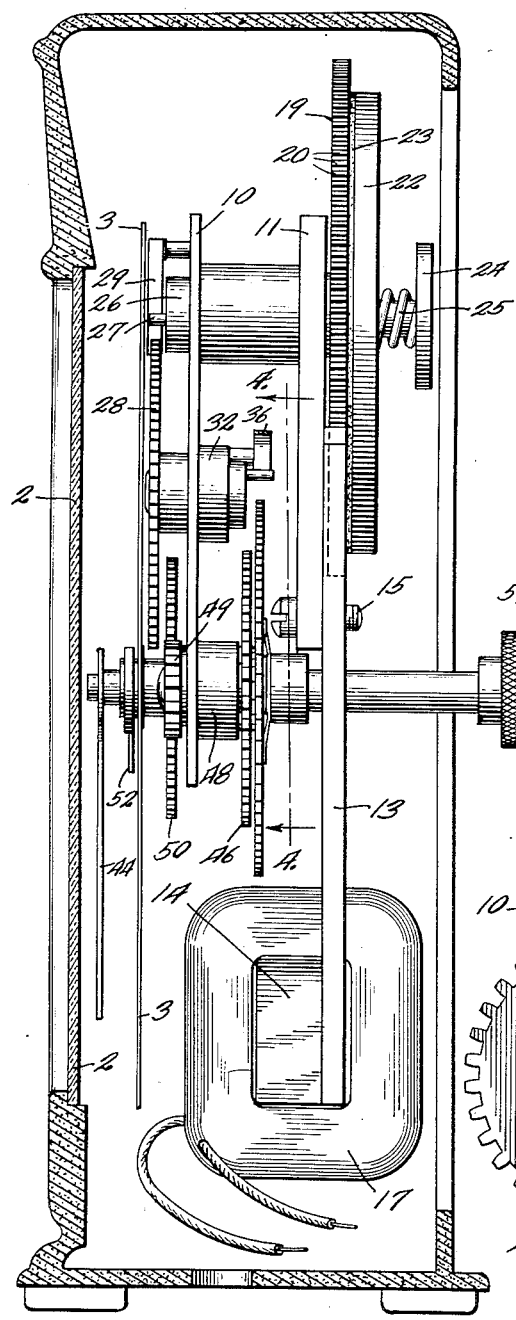
Figure 2 is a side elevational view of my improved clock mechanism, the casing therefor being shown in section.
Figure 3:
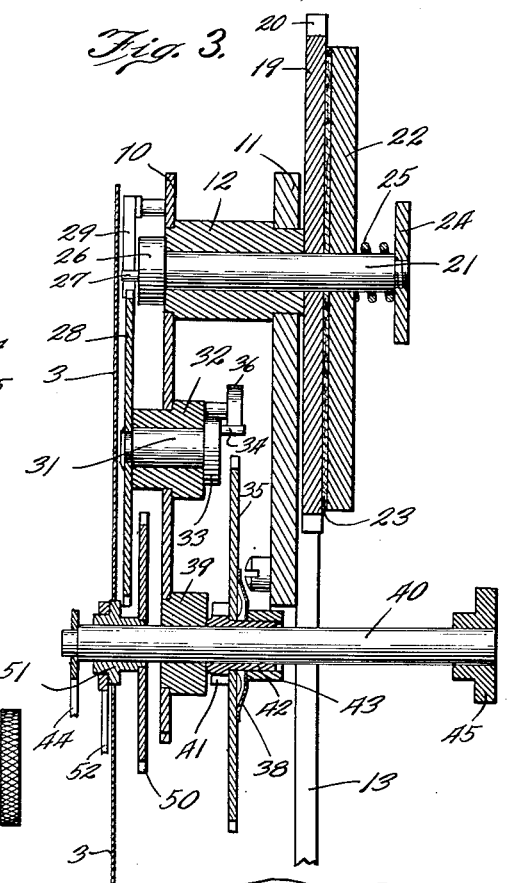
Figure 3 is a vertical sectional view taken on line 3—3 of Figure 1, showing particularly the rotor assembly and the gear train connecting the same with the minute hand shaft.
Figure 4:
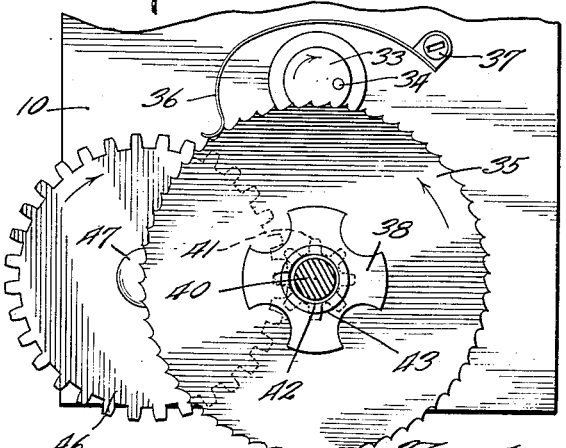
Figure 4 is an elevational view taken on line 4—4 of Figure 2 and looking in a direction of the arrows.

As shown in Figures 2 and 3, the rotor shaft 21 has mounted thereon a non-magnetic disc 22; said disc is carried on the shaft 21, but is not held against rotation in relation thereto. One face of the disc 22 is disposed against the rotor 19, and is provided with a felt washer 23, which forms a friction facing between the said disc and the rotor. The end of the shaft 21 has threaded thereon a stop or thumb piece 24, between which and the disc 22 is interposed a coil spring 25, which is adapted for normally urging said disc 22 into frictional engagement with the rotor 19. In response to the frictional engagement of the rotor 19 and disc 22, the disc normally rotated substantially in unison with the rotor, although in response to sudden changes in speed of the rotor 19 on the shaft 21 there may be slippage or relative movement, which movement with the consequent performance of work and generation of heat and utilization of energy effect the regulating function, that is, prevents hunting of the armature and makes the motor automatically fall into step when launched at a speed other than the normal synchronous speed.

The rotor shaft 21 has rigidly mounted thereon at its forward end a disc 26, upon which is eccentrically mounted a pin 27, which pin is adapted to engage a ratchet gear 28, which is provided with 60 teeth, whereby said ratchet gear will make one complete turn in one minute or sixty seconds. A leaf spring 29, secured to the plate 10, at 30, is provided for engaging the ratchet gear 28 to prevent slipping or over-running of the same. The gear 28 is rigid with a shaft 31, which is journaled in a bushing 32, said bushing being rigidly secured to the plate 10, and provides a single bearing for the shaft 31. The other end of the shaft 31 has rigidly secured thereto a disc 33, upon which is eccentrically mounted a pin 34, which is adapted to engage a ratchet gear 35, which is also provided on the periphery thereof with 60 teeth, and will therefore make one revolution in sixty minutes. A leaf spring 36, secured to the plate 10, at 37, is provided for engaging the ratchet gear 35 to prevent slipping or over-running of the same.

The gear 35 is frictionally secured by means of the spring 38 to the minute hand shaft 40, whereby it will rotate therewith. The shaft 40, as shown in Figure 3 of the drawings, has a single bearing in a bushing 39, which is rigidly secured to the plate 10. The connection between the gear 35 and the shaft 40 may be accomplished by the following means: A pinion 41, having a reduced portion 42 is pressed onto the minute hand shaft 40. The gear 35 is loosely mounted on the said reduced portion 42, and a collar 43 is pressed onto the free end of the reduced portion 42, the spring 38 being interposed between the gear 35 and the collar 43. The minute hand 44 is mounted on the free end of the shaft 40 so as to rotate therewith, and since the ratchet gear 35 is connected to the shaft 40, said hand 44 will make one revolution every 60 minutes. The shaft 40 has a suitable knurled thumb piece 45 secured at its rearward end by which the clock may be set.

The pinion 41 carried on the minute hand shaft 40 meshes with a gear 46, which is rigidly secured to the shaft 47, having a bearing in a bushing 48, rigidly secured to the front plate 10. The other end of the shaft 47 has rigidly secured thereto for rotation therewith a pinion 49, which meshes with a gear 50, rigidly mounted on a sleeve 51, which sleeve is loosely mounted on the minute hand shaft 40. The sleeve 51 carries at its forward end the hour hand 52. The hour hand 52 is thus driven by the minute hand shaft 40, through the pinion 41, gear 46, pinion 49 and gear 50, said gear train having a reduction ratio of 12 to 1, causing one turn of the hour hand 52 every twelve hours.

The hands 44 and 52 register with the dial 3, through which the sleeve 51 extends, as shown in the drawings. The said dial may be supported from the casing 1, in which the clock mechanism is mounted.

The thumb piece 24, secured on the rearward end of the rotor shaft 21, may be utilized for manually starting the clock, as a single twirl of this thumb piece will impart sufficient speed to the rotor 19 to cause the same to revolve at super-synchronous speed. As the rotor slows down to synchronous speed due to the frictional load imposed by the gear train, it will fall in step and continue rotating at synchronous speed. A further and improved mechanism is also provided for starting the clock. This mechanism, as shown in Figure 1, comprises a plunger 55, the upper end of which is adapted to extend through the top wall of the casing 1. The plunger 55 is slidably mounted in a suitable bracket 56, which is secured to the frame carrying the clock mechanism. The lower end of the plunger 55 has rigidly secured thereto a spring steel member 57, which is disposed in position to engage the rotor 19 to impart rotary movement to the same whenever the plunger 55 is depressed.

A coil spring 58 is interposed between the bracket 56 and a pin 59 secured to the plunger, whereby the said coil spring will be effective for normally holding the plunger in the raised position and out of engagement with the rotor 19. When, however, the plunger 55 is depressed against the action of the coil spring 58, the spring 57 will engage the rotor and move the same in the proper direction, which movement will be sufficient to launch the motor at a speed above synchronism. The provision of my improved starting means will insure the motor being started at all times in the proper direction and at substantially the same speed.

The action of the combination of rotor and frictionally held disc 22 is most effective in practice and may be explained as follows: When the rotor is revolving at any uniform speed or at a speed very nearly uniform, the disc 22 revolves with the rest of the rotor, and there is scarcely any displacement between the disc and rotor. If the speed of the rotor is increased or decreased the inertia of the disc causes it to slip on the shaft and the friction between it and the shaft and rotor constitutes energy dissipation, which work is done at the expense of any force of any kind tending to accelerate or retard the motion of the revolving unit as a whole.

Thus, if the clock is started at a speed greater than the normal synchronous running speed, the natural friction on the bearings and from the load causes it to slow down gradually until the speed of the rotor approaches the normal running speed. When a certain point is reached the rotor will suddenly be violently retarded by the stationary magnetic members, and if it were not for said frictional disc, would be retarded to a point below synchronous speed and would thereafter continue to slow up and eventually stop.

The frictional disc, however, when the sudden retarding action takes place, is retarded at a rate less than the rotating effect on the other portions of the rotor, and will damp the motion of the rotor in such a way as to permit it to continue running in synchronism.

Similarly, the action of the frictional disc is to enable the rotor to fall in step and run synchronously from a speed less than the normal speed.

The rotor carrying the loose disc cannot be made to hunt violently, as hunting of any kind means accelerated motion, which causes work to be done between the disc and the other revolving parts, which damps the oscillation.

It will be especially noted that the device is designed for a slow motor speed, thus resulting in longer life for the motor and in the elimination of motor vibration. Also, the gear train is extremely simple in construction and is so arranged as to be very compact and to make possible the installation of this mechanism in a small clock. A further feature is the provision of a single bearing for all shafts, whereby not only ease of assembly is obtained, but also a perfect bearing alignment.

It is believed that my invention, its mode of construction and assembly, and many of its advantages should be readily understood from the foregoing without further description, and it will be manifest that while a preferred embodiment of the invention has been shown and described, for illustrative purposes, the structural details are, nevertheless, capable of wide variation within the purview of my invention as defined in the appended claims.

I do not restrict myself in any unessential particulars, but what I claim and desire to secure by Letters Patent is:

1. In an electric motor driven clock, a bushing, a frame comprising a pair of spaced plates connected to each other by said bushing, a motor armature, a shaft bearing said armature journaled in said bushing, a gear train mounted on said frame, said gear train being driven by said armature, and each of the shafts of said gear train having a single bearing which is formed by bushings rigidly secured to one of said plate members.

2. The invention of claim 1 further including a stop secured to said shaft in spaced relation to said armature, an inertia member loosely mounted on said shaft between said armature and said stop, a spring compressed between said inertia member and said stop and adapted to hold said member against said armature, and a friction facing disposed between said armature and member.

3. The invention of claim 1 further including a driving cam pin secured at one end of said shaft, an inertia member rotatable on said shaft, a coil spring surrounding said shaft, and a stop on the rear end of said shaft, said coil spring being pressed between said armature and stop to hold said inertia member in frictional contact with said armature.

PAUL M. BLOUGH.

REFERENCES CITED

The following references are of record in the file of this patent:

UNITED STATES PATENTS

| Number | Name | Date |
| --- | --- | --- |
| 1,924,853 | Hammond | Aug. 29, 1933 |
| 2,133,052 | Borgfeldt | Oct. 11, 1938 |

FOREIGN PATENTS

| Number | Country | Date |
| --- | --- | --- |
| 593,122 | Great Britain | Oct. 8, 1947 |